United States Patent [19]

Romano

[11] Patent Number: 5,437,582
[45] Date of Patent: Aug. 1, 1995

[54] SPROCKET ASSEMBLY FOR BICYCLES

[75] Inventor: Antonio Romano, Padova, Italy

[73] Assignee: Campagnolo S.r.l., Vicenza, Italy

[21] Appl. No.: 222,527

[22] Filed: Apr. 4, 1994

[30] Foreign Application Priority Data

Jun. 3, 1993 [IT] Italy .................... TO93A0391

[51] Int. Cl.⁶ ............................................. F16H 55/30
[52] U.S. Cl. ................................... 474/156; 474/160
[58] Field of Search ........................... 474/152–156, 474/160–163

[56] References Cited

U.S. PATENT DOCUMENTS

| | | | |
|---|---|---|---|
| 5,162,022 | 11/1992 | Kobayashi | 474/155 |
| 5,188,569 | 2/1993 | Kobayashi | 474/160 |
| 5,192,248 | 3/1993 | Nagano | 474/160 X |
| 5,192,249 | 3/1993 | Nagano | 474/160 |
| 5,192,250 | 3/1993 | Kobayashi | 474/162 |

Primary Examiner—Michael Powell Buiz
Attorney, Agent, or Firm—Sughrue, Mion, Zinn, Macpeak & Seas

[57] ABSTRACT

A sprocket assembly for bicycles includes at least two sprockets with different diameters arranged side by side, the larger diameter sprocket having a tooth for supporting the chain during the displacement of the latter from the smaller diameter sprocket to the larger diameter sprocket. This tooth has, to this end, a stepped support surface arranged on the side opposite to that facing the smaller diameter sprocket.

3 Claims, 6 Drawing Sheets

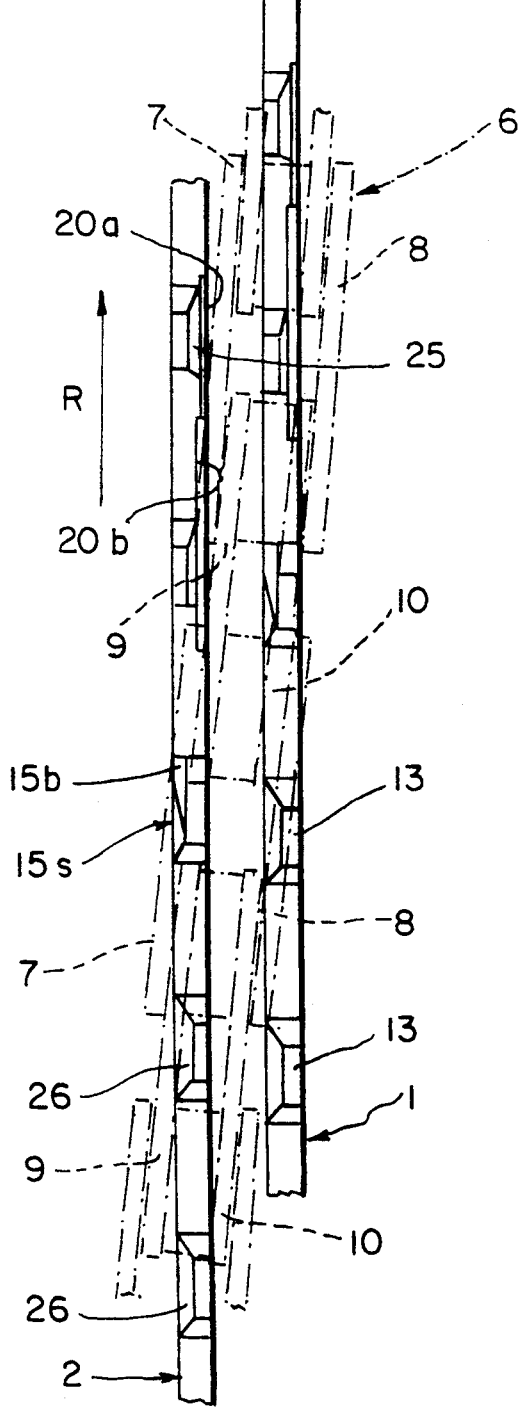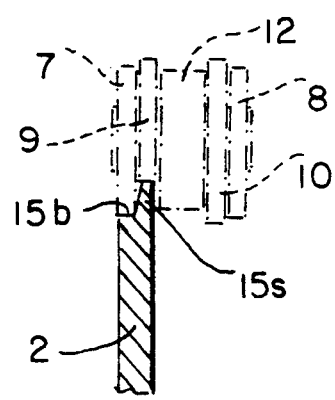

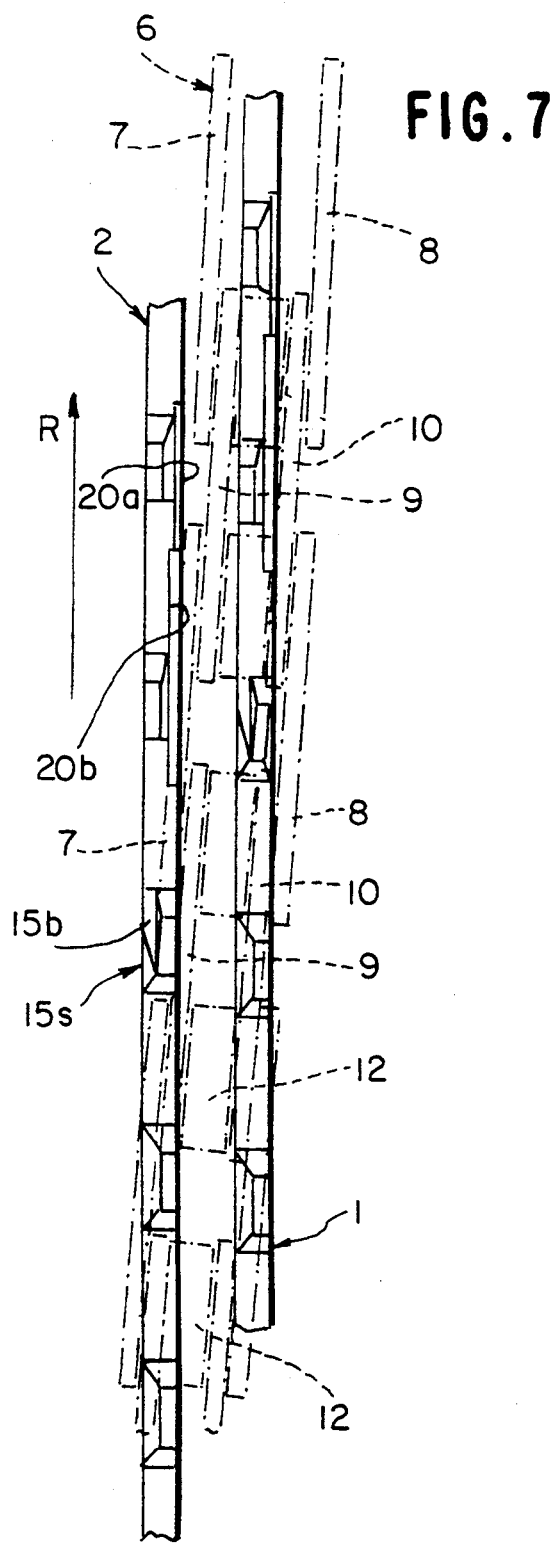
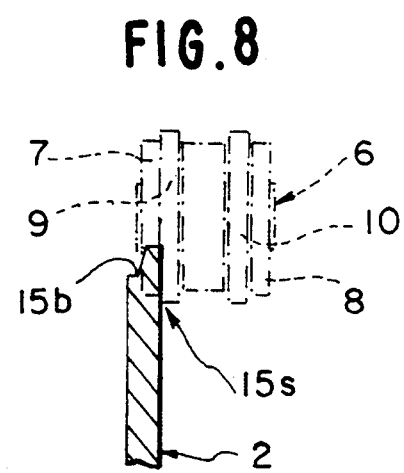
FIG. 7
FIG. 8

SPROCKET ASSEMBLY FOR BICYCLES

FIELD OF THE INVENTION

The present invention relates to sprocket assemblies for bicycles of the type comprising a plurality of sprockets coaxially and side by side to each other, said sprockets having diameters which increase from one end to the opposite end of the assembly, said sprockets being designed for selectively engaging a drive chain comprising pairs of parallel and spaced apart plates, pivotally connected to each other by articulation pins carrying respective rollers, the plates of each pair being alternatively arranged at the outside and at the inside of the plates of the next pair so as to define alternatively narrower and larger chain links.

According to the conventional art, the chain is brought selectively into engagement with the various sprockets of the sprocket assembly in order to provide the different transmission speeds as required, by means of the bicycle derailer.

BASIC TECHNICAL PROBLEM

In recent years studies and tests have been more and more developed in order to provide sprocket assemblies which ensure a passage as easy, quick and noiseless as possible of the chain from one sprocket to the other and particularly from one smaller diameter sprocket to one larger diameter sprocket. The need of a quick and smooth chain shift is felt in general in all types of bicycles and particularly in race bicycles and in mountain-bikes.

PRIOR ART

In the endeavour to solve the said problem, there have been proposed various solutions relating to particular shapes of the teeth of the sprockets which favour an easy shift of the chain from one sprocket to the other.

U.S. Pat. No. 4,268,259 discloses a sprocket assembly of the type indicated at the beginning, in which said sprockets are formed and mounted relative to each other in such a way that during the displacement of the chain from one smaller diameter sprocket to one larger diameter sprocket, the chain disengages from the smaller diameter sprocket at a first predetermined recess between two adjacent teeth of the smaller diameter sprocket and engages the larger diameter sprocket at a second predetermined recess between two adjacent teeth of the larger diameter sprocket. In this known solution, the centres of said first and second recess lie on straight line substantially tangent to the smaller diameter sprocket and the distance between said centres is an integer multiple of the chain pitch, so that during said displacement, the chain should theoretically engage the larger diameter sprocket with one of its rollers exactly at said second recess. This solution is not fully satisfactory, since the chain portion interposed between the smaller diameter sprocket and the larger diameter sprocket, during the displacement, cannot be arranged according to the theoretical straight line joining said centres of said first and second recess because of the interference between the plates of the chain and the side of the larger diameter sprocket facing the smaller diameter sprocket.

In the endeavour to overcome this inconvenience, an improvement of the above mentioned known solution has been disclosed in U.S. Pat. No. 4,889,521. In the case of this improvement, said feature relating to the distance between the centres of said first and second recess being an integer multiple of the chain pitch has been combined with two further features. Firstly, the side of the larger diameter sprocket facing the smaller diameter sprocket is provided with a so called "chain guide surface" which is formed by a depressed portion which allows the chain to deviate to greater extent in the direction of the larger diameter sprocket during the chain shift. Secondly, the contour of this "chain guide surface" is chosen so as to define a step on which the chain abuts in order to be biased toward the larger diameter sprocket during the chain shift. In this further known document, it is also mentioned that said distance between the centres of said first and second recess can be also slightly lower than an integer multiple of the chain pitch, although it is made clear that the desired effect is that a roller of the chain comes exactly at the appointment with said second recess on the larger diameter sprocket during the chain shift, so as to be received directly on the bottom surface of this recess, without any collision with the adjacent tooth. In case of such a collision, indeed, the chain could not immediately engage the larger diameter sprocket and said roller would "fall" over the bottom surface of said second recess producing thereby noise.

The above described solution cannot be considered fully satisfactory from the standpoint of simplicity and economy of manufacture.

In another known solution disclosed in U.S. Pat. No. 5,162,022 the sprockets are shaped and arranged relative to each other in such a way that said distance between the centres of said first recess and said second recess is substantially lower than an integer multiple of the chain pitch, so that the chain enters into collision with at least one tooth of the larger diameter sprocket during the chain shift. However, the roller of the chain is not free to fall in the respective recess of the larger diameter sprocket after this collision, since two teeth of the larger diameter sprocket are provided with asymmetrical profiles including two support portions which enter in contact with two chain links, supporting the latter so as to prevent the fall of the respective rollers in the corresponding recesses of the larger diameter sprocket until the chain is perfectly engaged on this sprocket.

Also this solution is not satisfactory from the point of view of simplicity of manufacture. As it has been indicated, the assembly is arranged so that on the larger diameter sprocket at least two teeth enter in engagement with the chain and, to this end, they are provided with said asymmetrical profiles including said support portions.

A further solution which provides a support surface of the chain on one tooth of the larger diameter sprocket (on one tooth only in this case) is also disclosed in U.S. Pat. No. 5,073,151. This solution, however, further provides on the smaller diameter sprocket a tooth which is cut in order to avoid interference with the chain during the chain shift, which again implies a relatively complicated manufacture and an operation which is not completely satisfactory.

OBJECT OF THE INVENTION

The object of the present invention is that of overcoming all the inconveniences of the prior art which has been mentioned in the foregoing, by providing a sprocket assembly which is able to perform an easy, quick and smooth chain shift and at the same time is relatively simple and economic to be manufactured.

THE INVENTION

In order to achieve the above mentioned object, the present invention provides a sprocket assembly for bicycles, comprising a plurality of sprockets arranged coaxially and side by side to each other, said sprockets having diameters which increase from one end to the other of the assembly, said sprockets being designed for being selectively engaged by a drive chain comprising pairs of plates pivotally connected to each other by articulation pins carrying respective rollers, the plates of each pair being alternatively arranged at the outside and at the inside of the plates of the next pair, so as to define alternatively larger and narrower chain links (referred to as large and narrow chain links in the following), in which said sprockets are shaped and mounted relative to each other so that during the chain shift from one smaller diameter sprocket to one larger diameter sprocket, the chain disengages from the smaller diameter sprocket at a first predetermined recess between two adjacent teeth of the smaller diameter sprocket and enters in contact with a tooth of the larger diameter sprocket adjacent to a second predetermined recess between two adjacent teeth of the larger diameter sprocket, in which the centres of said first and second recesses lie on a straight line substantially tangent to the smaller diameter sprocket and in which the distance between said centres is substantially lower than an integer multiple of the chain pitch, so that during said chain shift, the chain enters in contact with the larger diameter sprocket at a tooth which follows, with reference to the direction of rotation of the sprocket, said second recess, and is held up by this tooth until the respective roller of the chain is completely received within said second recess, characterised in that said sprockets are shaped and mounted relative to each other in such a way that the chain is held up during the chain shift by a single tooth of the larger diameter sprocket until the chain shift is completed and in that this chain supporting tooth has on its side opposite to that facing the smaller diameter sprocket a stepped support surface, for supporting the edge of one plate of a large link of the chain.

ADVANTAGES OF THE INVENTION

Due to the above indicated features, the sprocket assembly according to the invention is able to perform a quicker and safer chain shift with respect to the known solutions while ensuring a smooth and noiseless manoeuvre. At the same time, the sprockets are simple and relatively economic to manufacture.

BRIEF DESCRIPTION OF THE DRAWINGS

FIG. 3 is a partial view, at an enlarged scale, according to the direction of arrow III of FIG. 1, FIG. 4 is a cross-sectional view taken along line IV—IV of FIG. 1, and FIGS. 5 through 8 are views corresponding to those of FIGS. 1–4 which refer to a second derailing mode relating to the case in which the chain supporting tooth provided on the larger diameter sprocket engages a narrow chain link, rather than a large chain link.

DETAILED DESCRIPTION OF A PREFERRED EMBODIMENT OF THE INVENTION

Figure 1:
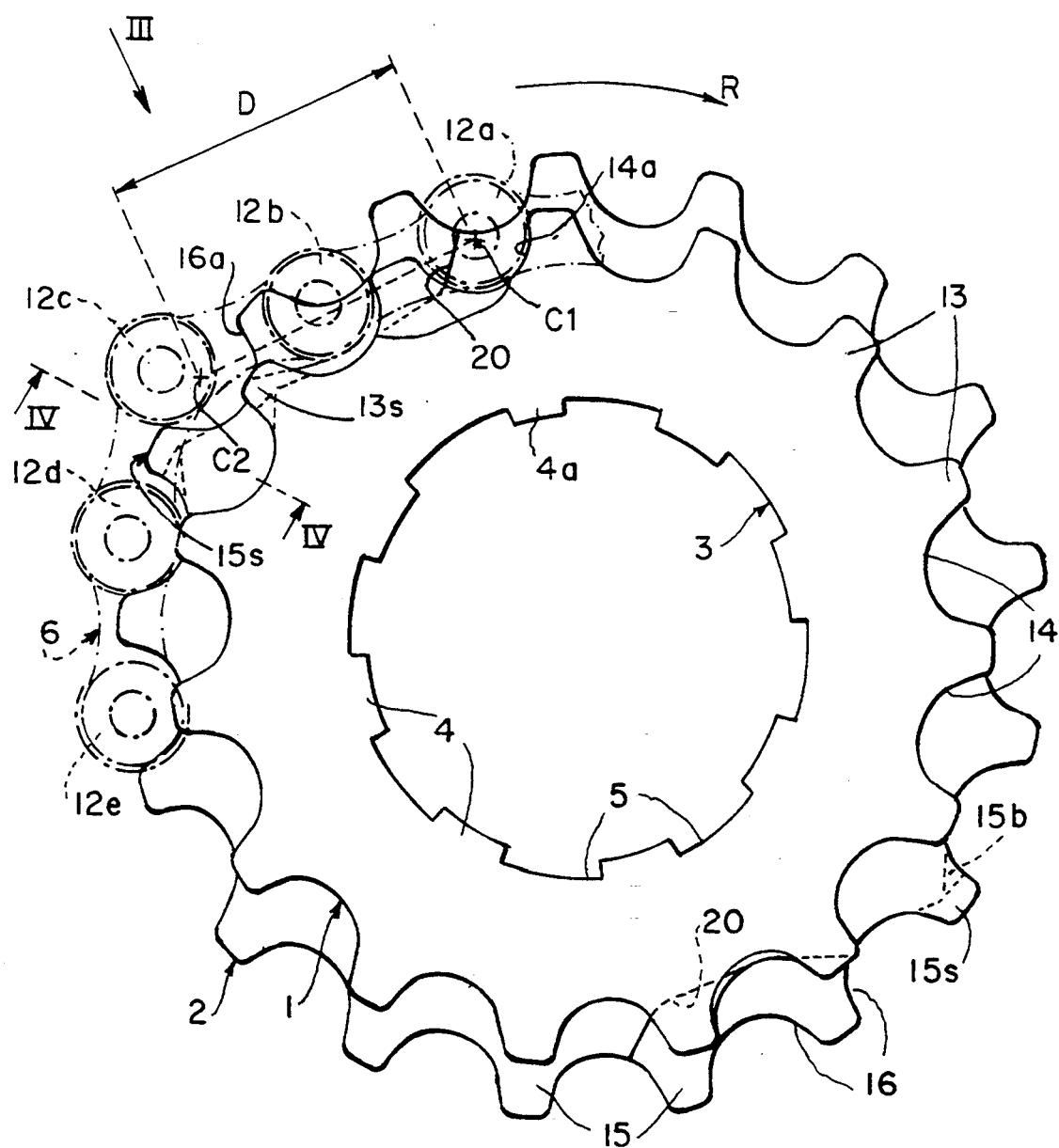
FIG. 1 is a front view of a sprocket assembly according to the invention, shown for sake of simplicity as comprising only two sprockets, with the chain shown during the derailing stage, according to a first derailing mode from the smaller sprocket to the larger sprocket.

In the drawings, reference numerals 1, 2 respectively designate a smaller diameter sprocket and a larger diameter sprocket forming part of a sprocket assembly according to the invention. According to the conventional art, said sprockets have a flattened annular body with a central aperture 3 whose edge has a plurality of teeth 4 angularly spaced from each other and slots 5 between teeth 4 in order to enable the sprockets to be coaxially mounted on the hub of the rear wheel of a bicycle.

The invention is illustrated with reference to the case of a sprocket assembly which is to cooperate with a rear derailer of a bicycle, but it is clearly apparent that the invention is also applicable to a sprocket assembly which is to cooperate with a front derailer of a bicycle.

As visible in FIG. 1, an inner tooth 4a of both sprockets 1, 2 is different from the other teeth 4 to provide a reference of the proper mounting angular position of the sprockets. As it will become apparent from the following description, it is indeed important that the various sprockets of the sprocket assembly are mounted in a predetermined angular position relative to each other.

Figure 2:
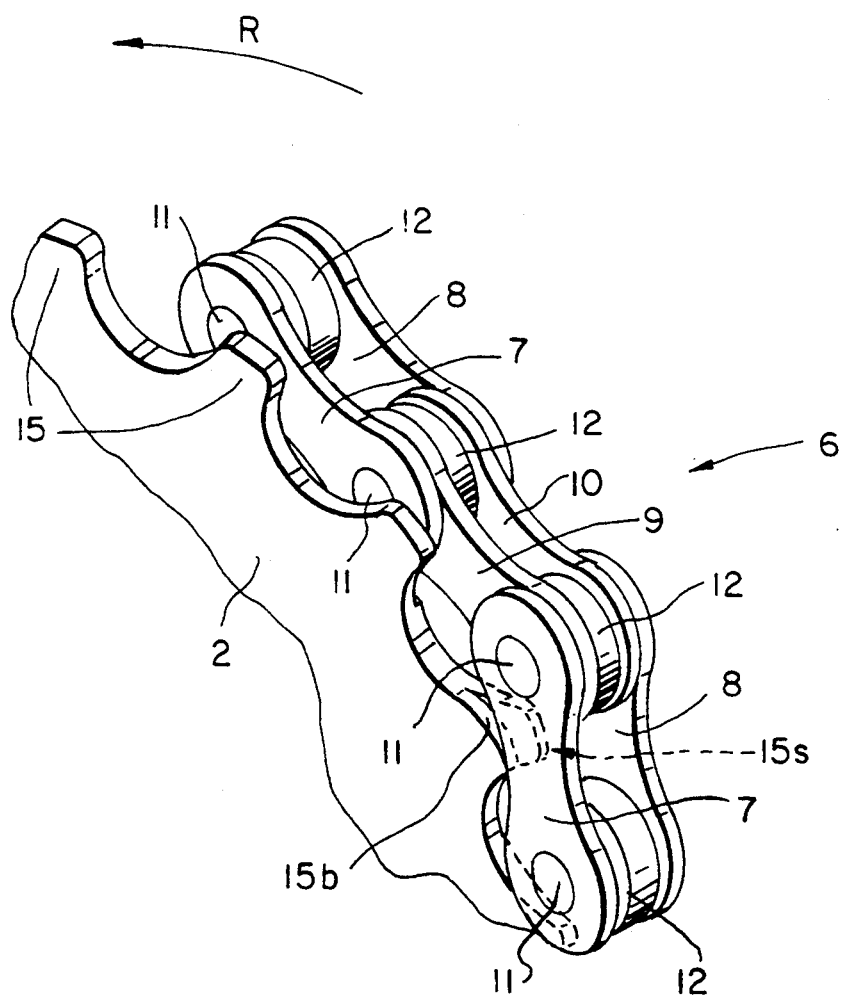
FIG. 2 is a perspective view at an enlarged scale of a detail of the assembly of FIG. 1, as viewed from the side opposite to that which is visible in FIG. 1.

Reference numeral 6 designates the bicycle chain which is to engage selectively sprockets 1, 2. As visible more clearly in FIGS. 2, 3, chain 6 comprises, according to a conventional technique, a plurality of pairs of plates 7, 8 and 9, 10 which are pivotally connected to each other by articulation pins 11 carrying rollers 12 which are received in the recesses between the teeth of a sprocket when the chain engages the latter.

Still with reference to the drawings, the smaller diameter sprocket 1 comprises a plurality of teeth 13 spaced by recesses 14, whereas sprocket 2 comprises a plurality of teeth 15 spaced by recesses 16. The drawing relates to the case in which the two sprockets 1, 2 have teeth numbers which differ from each other by 2 and have the resulting difference in diameter. Naturally, however, it is possible that the numbers of teeth of the two sprockets differ by 1 or by any other integer.

Figure 5:
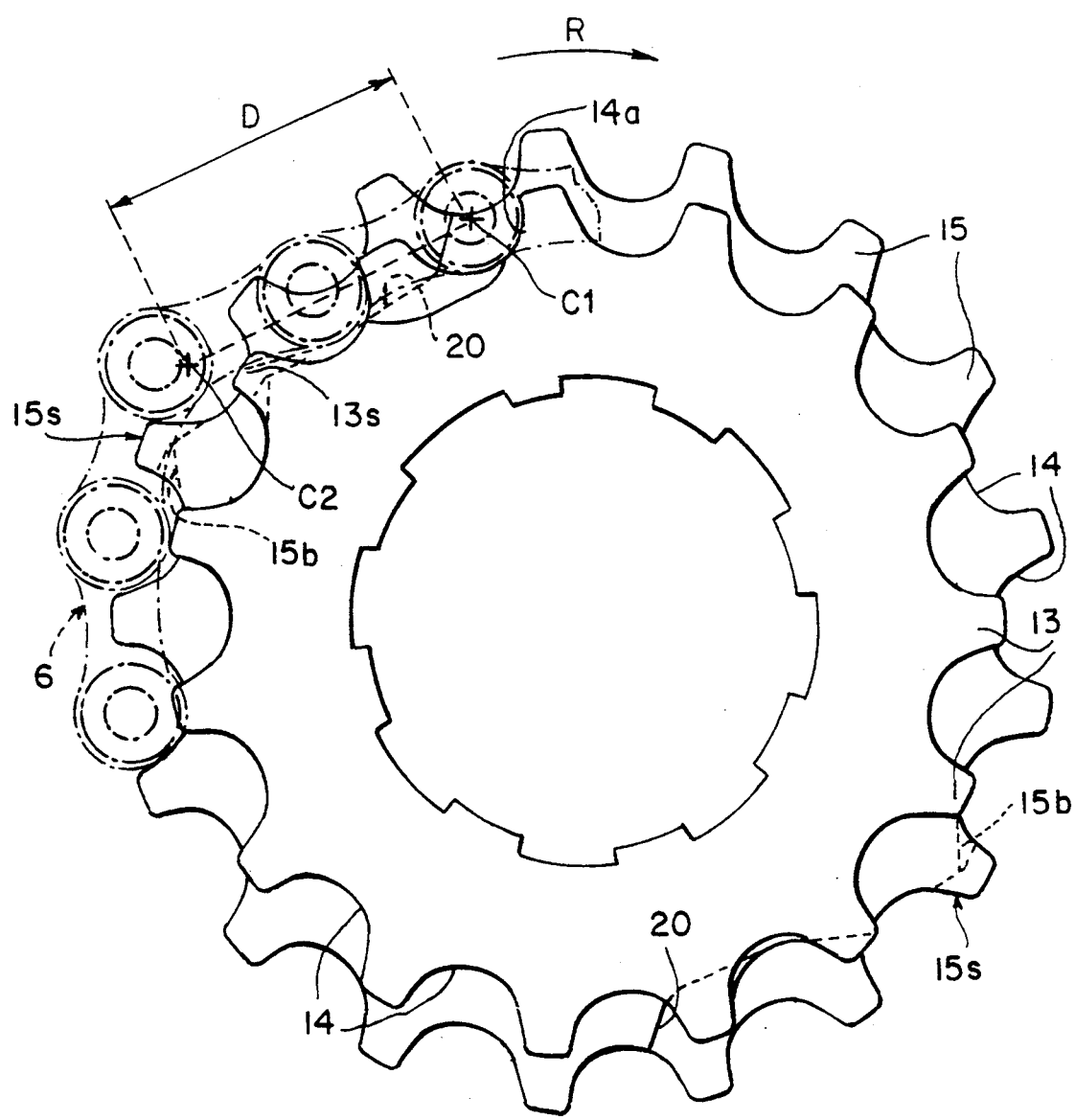
Figure 6:
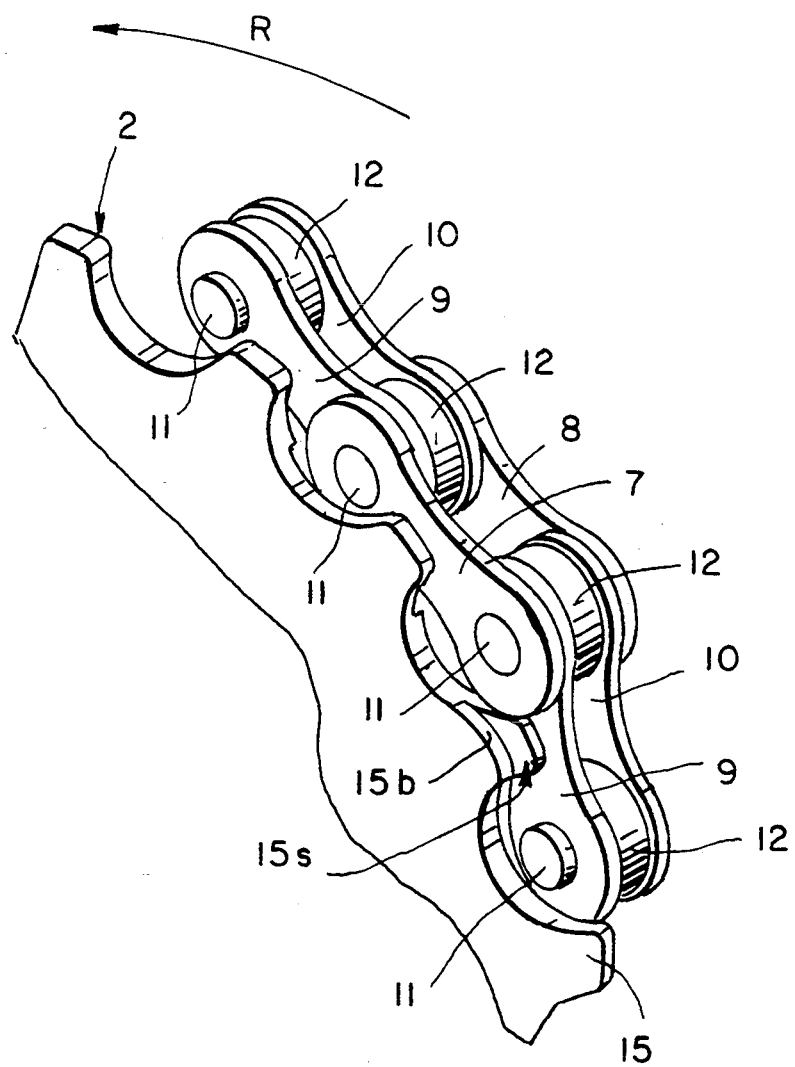

The teeth of sprockets 1, 2 are so shaped, and the two sprockets 1, 2 are arranged relative to each other in such a way, that when the chain 6 is derailed by the smaller diameter sprocket 1 to the larger diameter sprocket 2, it disengages from sprocket 1 at a first predetermined recess, having a centre C1, of sprocket 1, and enters in contact with sprocket 2 in proximity of a second predetermined recess, having a centre C2. In FIGS. 1, 5, the direction of rotation of the sprockets is indicated by arrow R. As it is shown, centres C1, C2, whose recesses are respectively indicated with 14a and 16a, lie on a straight line which is substantially tangent to the smaller diameter sprocket.

In FIGS. 1 and 5, the rollers of the portion of chain 6 comprised between the smaller diameter sprocket and the larger diameter sprocket are respectively designated by 12a, 12b, 12c, 12d and 12e. The distance between the two centres C1 and C2 being substantially the double of the pitch of chain 6 (which is equivalent to the distance between the centres of rollers 12a, 12c) decreased by a length x which is chosen in such a way that, as illustrated in FIGS. 1, 5, the roller 12c is not received on the bottom of recess 16a of the larger diameter sprocket, whereas it enters in contact with a tooth 15s which immediately follows recess 16a with reference to the direction of rotation R and which will be defined in the following with the term "chain supporting tooth".

According to the conventional art, the teeth 15 of the larger diameter sprocket which precede (with reference to the direction of rotation R) the recess 16a are formed with chamfered surfaces on their sides facing towards the smaller diameter sprocket, so as to discourage the engagement of the chain thereon. In this way, the first contact of the chain with the larger diameter sprocket takes place at the tooth 15s adjacent to said recess 16a. Still according to a known art, immediately in front of the recess 16a, the teeth of the larger diameter sprocket have a depressed surface 20 which enables the chain to deviate to a greater extent in the direction of the larger diameter sprocket 2 during the chain shift. As it is visible in figures 1, 5, also the smaller diameter sprocket 1 shown in these figures has a chain supporting tooth 13s and a depressed surface 20, since sprocket 1 can be on its turn a "larger diameter sprocket" with respect to a smaller sprocket arranged at its side (not illustrated in the annexed drawings).

As it has been indicated in the foregoing, the relative position of the two sprockets 1, 2 is such that the distance between centres C1 and C2 has a predetermined value, substantially smaller than the double of the chain pitch. In the case in which the two sprockets have a number of teeth which differs by 2, as illustrated in FIGS. 1 and 5, said predetermined arrangement of centres C1 and C2 takes place at two diametrically opposed areas of the sprockets, so that the engagement of the chain may take place at any of such two areas. If the number of teeth of the two sprockets differs only by 1, said predetermined condition relative to the position of recesses 14a and 16a takes place only in one area of the sprockets. If the difference in the number of teeth between the sprockets is 3, the condition would be verified in three separate areas of the sprockets, and so on.

The two groups of FIGS. 1-4 and 5-8 show the two different modes of chain shift which may take place with the sprocket assembly according to the invention, depending upon whether, during the chain shift, the chain supporting tooth 15s provided on the larger diameter sprocket comes to a large link or a narrow link of the chain 6, one or the other event being absolutely casual.

FIGS. 1-4 refer to the case in which (see in particular FIG. 2) the tooth 15s is intercepted by a "large" link of the chain, i.e. by a link defined by two plates 7, 8 which are more spaced apart from each other with respect to plates 9, 10 of the "narrow" links. As it is clearly apparent from FIG. 2, in this case plate 7 passes over tooth 15s engaging the side of the latter opposite to that facing the smaller diameter sprocket. The peripheral edge of this plate 7 abuts thereby on a stepped support surface 15b provided on the side of tooth 15s opposite to that facing the smaller diameter sprocket. At the same time, the top of tooth 15s engages the peripheral edge of the plate 9 which immediately precedes (with reference to the direction of rotation R) the said plate 7.

The support tooth 15s is the only support point for the chain portion interposed between sprocket 1 and sprocket 2 during the chain shift until the chain is completely engaged on the sprocket 2. In the case of the derailing mode shown in FIGS. 1-4 this hold-up action is carried out, as it has been indicated already, by the stepped surface 15b formed on the rear face of tooth 15a.

FIGS. 5 through 8 refer to the case in which (see in particular FIG. 6) during the chain shift the support tooth 15s comes to face a plate 9 of a "narrow" link of chain 6. In this case, tooth 15s carries out its hold up action by its top edge which comes into engagement with the plate 7 which precedes the said plate 9 with reference to the direction of rotation R.

FIGS. 3, 7 make clearly visible the depression 20 on sprocket 2, which includes two different planes 20a, 20b. These figures further show clearly the chamfers 25 provided on the sides facing toward the smaller diameter sprocket of the teeth 15 which precede tooth 15s with reference to the direction of rotation. These figures also show chamfers 26 formed on the rear faces of two teeth 15 which follow tooth 15s, again with reference to the direction of rotation R, in order to favour the lowering of the plates of the chain which pass over such teeth and the resulting proper engagement of the chain on sprocket 2.

Tests conducted by the applicant show that the sprocket assembly according to the invention performs quick, smooth and noiseless chain shifts, due to the combination of measures which have been described above.

Naturally, while the principle of the invention remains the same, the details of construction and the embodiments may widely vary with respect to what has been described and illustrated purely by way of example, without departing from the scope of the present invention.

I claim:

1. Sprocket assembly for bicycles, comprising a plurality of sprockets arranged coaxially and side by side to each other, said sprockets having diameters increasing from one end to the other of the assembly, said sprockets being designed to be selectively engaged by a drive chain comprising pairs of plates pivotally connected to each other by articulation pins carrying respective rollers, the plates of each pair being arranged alternatively at the outside and the inside of the next pair of plates so as to define alternatively large chain links and narrow chain links, in which said sprockets are so shaped and mounted relative to each other that during the chain displacement from one smaller diameter sprocket to one larger diameter sprocket, the chain disengages from the smaller diameter sprocket at a first predetermined recess between two adjacent teeth of the smaller diameter sprocket and comes in contact with the larger diameter sprocket in proximity of a second predetermined recess between two adjacent teeth of the larger diameter sprocket, in which the centres of said first recess and said second recess lie on a straight line substantially tangent to the smaller diameter sprocket and in which the distance between said centres is substantially smaller than an integer multiple of the chain pitch, so that during said displacement, the chain comes into engagement with the larger diameter sprocket (2) at a tooth which follows, with reference to the direction of rotation of the sprockets, said second recess, said chain being held up by said tooth until the respective roller is completely received within said second recess, wherein said sprockets are shaped and mounted relative to each other so that the chain is held up by a single tooth of the larger diameter sprocket until the chain shift is completed and wherein said chain supporting tooth has, on its side opposite to that facing the smaller diameter sprocket, a stepped support surface for supporting the edge of a plate of a large chain link.

2. Sprocket assembly according to claim 1, wherein the larger diameter sprocket has, at the teeth which precede (with reference to the direction of rotation R) said chain supporting tooth, a depressed surface which enables the chain to deviate to a greater extent in the direction of the larger diameter sprocket, said depressed surface having two different planes.

3. Sprocket assembly according to claim 1, wherein the teeth of the larger diameter sprocket which precede (which reference the direction of rotation R) said chain supporting tooth have inclined surfaces on their side facing the smaller diameter sprocket in order to discourage an engagement of the chain and wherein the teeth which follow said chain supporting tooth have chamfered surfaces on their side opposite to that facing the smaller diameter sprocket to favour the lowering of the rollers of the chain into the recesses of the larger diameter sprocket.

* * * * *